Patented Dec. 1, 1953

2,661,354

UNITED STATES PATENT OFFICE 2,661,354

PREPARATION OF BENZOINS AND FUROINS

Claude J. Schmidle, Moorestown, N. J., assignor to Rohm & Haas Company, Philadelphia, Pa., a corporation of Delaware No Drawing. Application August 22, 1951,
Serial No. 243,159

3 Claims. (Cl. 260—347.8)

This invention deals with a method for preparing benzoins, α-hydroxy ketones of the formula

RCHOHCOR' wherein R and R' are aromatic nuclei or aromatic heterocyclic nuclei. The method comprises condensing together two molecules of an aldehyde or aldehydes which have attached to the carbonyl group a cycle having aromatic properties, the condensation reaction being effected in the presence of the cyanide salt of a strongly basic anion exchange resin.

Benzoin condensations have heretofore been effected under the influence of sodium, potassium, or barium cyanides. These catalysts can promote reversion of the benzoin formed and there are also formed in the reaction mixture small amounts of such products as benzyl benzoate, benzyl alcohol, benzoic acid, alkyl benzoates, mandelonitrile, and the like.

A convenient, simple, and efficient method has now been discovered wherein there is used as a catalyst for effecting benzoin condensations a cyanide salt of a strongly basic anion exchange resin. The desired condensation takes place on the resin surfaces. Reversion is minimized, there is a markedly reduced tendency for the formation of by-products, and the reaction products are not contaminated by cyanide and reaction products therefrom. Basic anion exchange resins are less influenced by the presence of impurities in the aldehydes being reacted than are alkali metal cyanides and the difficulties which arise from the presence of alkali halide in the alkali metal cyanides are avoided.

As strongly basic resins there may be used one or more of the insoluble polymers or copolymers of styrene in which there are quaternary ammonium methyl substituents on the aromatic nuclei. In one form of such resins cross-links are developed through copolymerization of styrene with polyvinyl benzene followed by halomethylation, and reaction with a tertiary amine such as trimethylamine, triethylamine, pyridine, benzyldimethylamine, hydroxyethyldimethylamine, or the like. The quaternary ammonium salt groups which are thus formed are converted to the hydroxide form when the resin is treated with a solution of a strong hydroxide, such as sodium hydroxide. The hydroxide form is readily converted to the cyanide form by being washed with an aqueous hydrocyanic acid solution. More detailed descriptions of strongly basic anion exchange resin of the above type are given in application Serial No. 759,308, filed July 5, 1947, by C. H. McBurney, now U. S. Patent 2,591,573, issued April 1, 1952.

In place of a quaternary ammonium anion exchange resin, there may be used other strongly basic ion exchange resins. For example, there may be used the insoluble condensates from urea and/or melamine, formaldehyde, and guanidine. These are likewise converted to salts of hydrocyanic acid when treated with an aqueous solution of this acid. Resins of this type, however, are generally less desirable than the quaternary ammonium type exchangers.

Benzaldehyde and furfuraldehyde are the prime examples of aldehydes having properties depending on a cycle with aromatic behavior. Two molecules of either of these can be condensed together or one molecule of each aldehyde can be condensed together to give symmetrical or unsymmetrical benzoins respectively. Simple substituted benzaldehydes can be condensed with themselves and in any case can be condensed with benzaldehyde or furfuraldehyde to give unsymmetrical benzoins. Substituents of interest include lower alkyl, lower alkoxy, chloro, bromo, dimethylamino, methylenedioxy, and the like groups.

In general terms the condensation reaction can be carried out with benzaldehyde and benzaldehydes substituted particularly in the para position with weak electron-releasing groups. Mixed or unsymmetrical benzoins can in general be formed from these and benzaldehydes substituted with electron-releasing groups or with weak electron-withdrawing groups. Effective electron-releasing groups are those having a "sigma value" between zero and —0.3, such as methyl, dimethylamino, or methoxy. Weak electron-withdrawing groups are those having a "sigma value" from zero to +0.4 (cf. Hammett, Physical Organic Chemistry, McGraw-Hill, New York, 1940).

Useful solvents for the system include methyl, ethyl, and isopropyl alcohols. These are generally used with a small proportion of water. These solvents serve not only to keep the reactants and products in solution during the reaction but also to take care of heat of reaction, the reaction being conveniently run with the solvent under reflux. Temperatures of reaction are between 50° and 100° C. with the range of 60° to 80° C. being preferred. The products may be obtained by cooling the reaction mixture or by driving off solvent. The products may be purified by extraction, crystallization, or other conventional step.

The reaction may be carried out batchwise, if desired. The cyanide salt of a strongly basic anion exchange resin is mixed with solvent and aldehyde or aldehydes and the mixture is heated to initiate reaction. When the reaction has run its course, the resin is filtered off and the product is recovered from the filtrate. The resin may be used over again and again. If it becomes seriously contaminated with impurities or anions of strong acids, it may be revivified by being treated with an alkali hydroxide solution. The revivified resin is then washed with dilute hydrocyanic acid solution and reused.

The use of an anion exchange cyanide resin is particularly favorable for carrying on the benzoin condensation in a continuous fashion. In one mode of operation the resin is held in a jacketed column maintained at reaction temperatures and an aldehyde solution is passed therethrough. The condensate is removed from the solution, as by chilling and filtering, and the solution with unreacted aldehyde and/or added aldehyde is returned to the column where the condensation reaction is effected. This method of operation provides maximum utilization of starting materials and high yield of product.

The invention is illustrated by the following examples in which parts are by weight.

*Example 1*

A mixture of 50 parts of benzaldehyde, 100 parts of ethanol, 40 parts of water, and 50 parts of an anion exchange resin in the form of a cyanide salt was heated under reflux for two hours. This resin was an insoluble copolymer of styrene and divinylbenzene which had been chloromethylated, quarternized with trimethylamine, converted with sodium hydroxide solution to the hydroxide form, and then rinsed with a dilute aqueous hydrocyanic acid solution to yield the cyanide salt of this resin. The reaction mixture was filtered while hot to remove the resin. The filtrate was allowed to become cool. Crystals of benzoin were deposited. They were filtered off in an amount of 39 parts. They melted at 136°–137° C.

*Example 2*

A mixture of 40 parts of furfural, 40 parts of ethanol, 80 parts of water, and 50 parts of the same resin used in Example 1 was heated under reflux for four hours. The hot mixture was filtered to remove the resin. As the filtrate cooled, crystals of furoin were formed. They were filtered off in an amount of 21 parts. Additional furoin was recoverable by washing the resin with hot ethanol and concentrating filtrate and mother liquor.

*Example 3*

A mixture of 7.3 parts of p-dimethylaminobenzaldehyde, 5.3 parts of benzaldehyde, 82 parts of 95% ethanol, three parts of a styrene-divinylbenzene copolymer having quaternary ammonium methyl substituents in the hydroxide form, and ten parts of a similar insoluble quarternary ammonium resin in the cyanide form was heated under reflux for three hours. The hot reaction mixture was filtered and the filtrate was poured onto cracked ice. A solid product was separated in an amount of nine parts. It was recrystallized from ethyl alcohol, then melting at 163°–264° C. and corresponding in composition to 4-dimethylaminobenzoin, $(CH_3)_2NC_6H_4CHOHCOC_6H_5$.

*Example 4*

A mixture of 27 parts of 4-methoxybenzaldehyde, 21 parts of benzaldehyde, 60 parts of 95% ethanol, 15 parts of water, and five parts of a copolymer of styrene and divinylbenzene which contained hydroxyethyldimethylammoniummethyl groups in their cyanide form was heated under reflux for three hours. The hot solution was filtered to remove the resin catalyst. The filtrate was steam distilled to remove ethanol and unreacted aldehydes. The oil and water mixture remaining was separated. The oil was chilled to form a solid which was washed with a little cold alcohol and dried. The product amounted to 35 parts. It melted at 105°–106° C. and corresponded in composition to 4-methoxybenzoin.

In the same way there may be condensed equal molar proportions of chlorobenzaldehyde and benzaldehyde, chlorobenzaldehyde and methoxybenzaldehyde, chlorobenzaldehyde and veratraldehyde, chlorobenzaldehyde and 3,4-methylenedioxybenzaldehyde, chlorobenzaldehyde and furfuraldehyde, dimethylaminobenzaldehyde and furfuraldehyde, etc.

*Example 5*

A mixture of 9.6 parts of furfural, 10.6 parts of benzaldehyde, 50 parts of 95% ethyl alcohol, 15 parts of water, and 15 parts of an anion exchange resin in its cyanide form, the resin being a styrene-polyvinylbenzene copolymer having quaternary ammonium methyl substituents, was heated for four hours under reflux. The reaction mixture was filtered while hot and the filtrate was cooled. After the cooled solution had been set aside for several days, crystals formed. They were separated and dried. The product melted at 137°–139° C. and was benzfuroin.

In general the condensation here described is effected in the presence of strongly basic anion exchange resin in the form of its cyanide salt with benzaldehyde, furfuraldehyde, or one of these aldehydes and a benzaldehyde substituted with weak electron-releasing groups or with weak electron-withdrawing groups. Substituted benzaldehydes may be represented by the formula

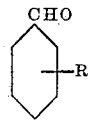

where R is an alkyl group up to four carbon atoms, a methoxy or ethoxy group, chlorine, bromine, or dimethylamino.

I claim:

1. A process for preparing benzoins which comprises condensing at least one aldehyde from the class consisting of benzaldehyde and furfuraldehyde by heating it between 50° and 100° C. in the presence of a strongly basic anion exchange resin in the form of its cyanide salt and in the presence of a saturated lower aliphatic monohydric alcohol as solvent.

2. The process of preparing benzoin which comprises condensing benzaldehyde by heating it between 50° and 100° C. in solution in a saturated lower aliphatic monohydric alcohol in the presence of a strongly basic anion exchange resin in a cyanide form.

3. The process of preparing furoin which comprises condensing furfural by heating between 50° and 100° C. a solution thereof in a saturated lower aliphatic monohydric alcohol with a strongly basic anion exchange resin in a cyanide salt form.

CLAUDE J. SCHMIDLE.

References Cited in the file of this patent

Organic Reactions, vol. IV, Wiley (1948).